Jan. 9, 1923.

E. P. LINDNER.
WIRELESS WAVE DETECTOR.
FILED DEC. 18, 1920.

EMMET P. LINDNER.
INVENTOR

BY Victor J. Evans
ATTORNEY

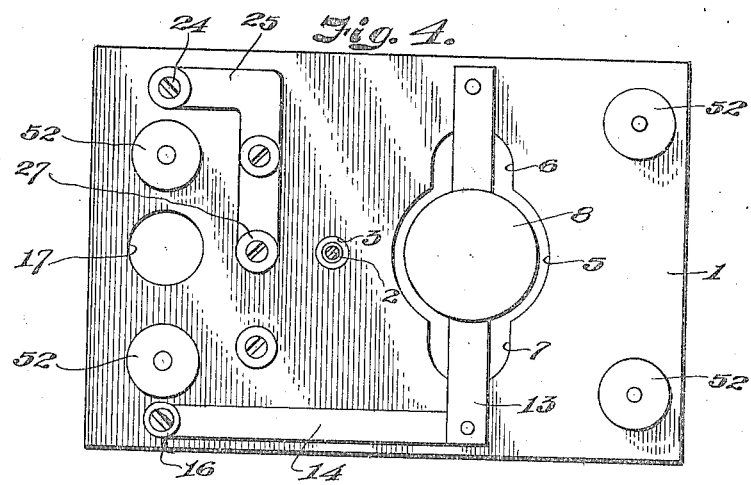
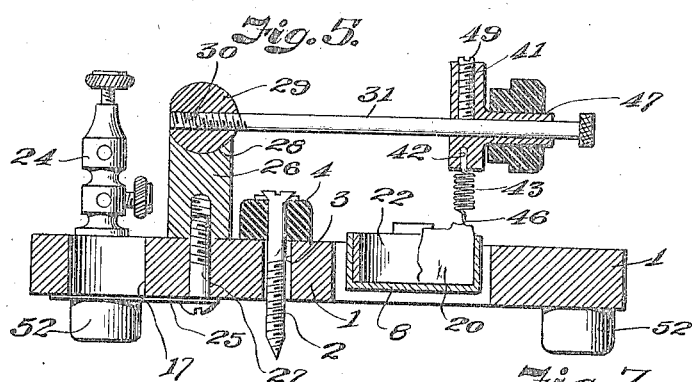
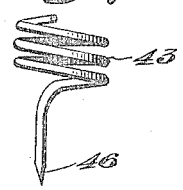
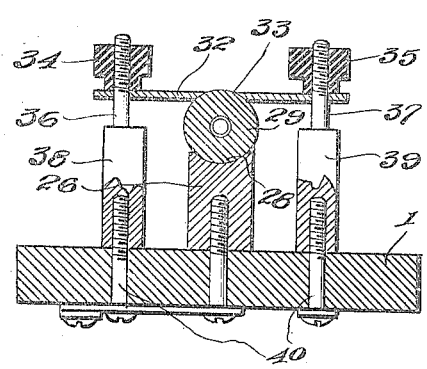

Patented Jan. 9, 1923.

1,441,988

UNITED STATES PATENT OFFICE.

EMMET P. LINDNER, OF INDIANAPOLIS, INDIANA.

WIRELESS WAVE DETECTOR.

Application filed December 18, 1920. Serial No. 431,662.

*To all whom it may concern:*

Be it known that I, EMMET P. LINDNER, a citizen of the United States, residing at Indianapolis, in the county of Marion and State of Indiana, have invented new and useful Improvements in Wireless Wave Detectors, of which the following is a specification.

This invention relates to wave detectors as used in wireless apparatus and an object of the invention is to provide a carborundum detector which is constructed to permit movement in any necessary direction making it possible to engage any sensitive spot on the mineral crystal with centralogical pressure of the contact point of the detector thus making the detector very sensitive as any spot on the surface of the mineral crystal can be met at any required pressure.

Another object of the invention is to provide a wave detector as specified, which is constructed to securely maintain the movable contact in any adjusted positition against vibration occasioned during the use of the apparatus and which will also permit the contact to be maintained in proper engagement with a sensitive piece of mineral crystal without the contact slipping.

Another object of the invention is to provide a wave detector which comprises a carrying rod on which it mounted, for longitudinal movement, a carrying block for the contact spring, the contact point of which is sharpened to permit sensitive and accurate engagement between the contact point of the spring and a carborundum or mineral crystal; and also to provide a supporting structure for the carrying rod which comprises a sphere or ball on the end of the rod engageable in a suitable socket, the frictional engagement of the ball with the socket being regulated by a spring plate which grips the surface of the ball opposite the socket and the tension of which is adjusted by adjustable thumb nuts.

A further object of the inventtion is to provide a holder for the mineral crystal which is rockably supported relative to the detector and comprises a suitable cup in which a spring clip is mounted for yieldably engaging the mineral crystal and maintaining it in proper position.

Other objects of the invention will appear in the following detailed description and in the accompanying drawings wherein:

Fig. 4 is a bottom plan of the wave detector.

Fig. 5 is a longitudinal vertical section through the detector taken on the line 5—5 of Fig. 2.

Fig. 6 is a vertical cross section through the detector taken on the line 6—6 of Fig. 2.

Fig. 7 is an enlarged fragmentary detail of the contact spring illustrating the manner of sharpening its contact point.

Figure 1:
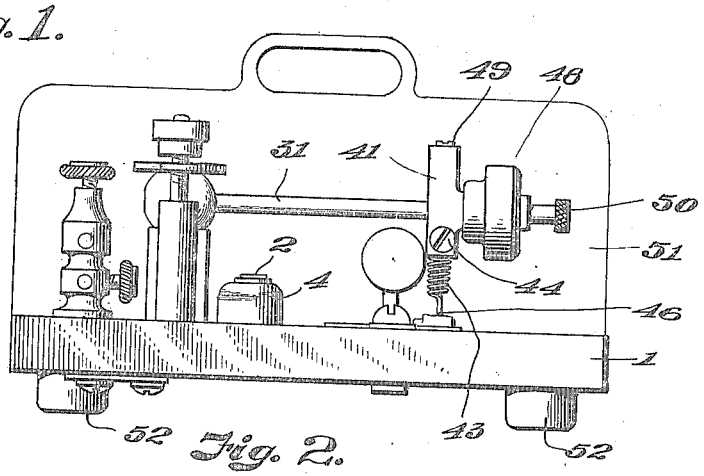
Fig. 1 is a side elevatiton of the improved wave detector.

Referring more particularly to the drawing the improved electrolytic wave detector comprises a base 1 of wood or any suitable nonconducting material which may be attached to a wireless apparatus switchboard by means of a screw 2 which extends through a suitable opening 3 in the base and also through a cushion insulating collar 4 which is mounted upon the upper surface of the supporting base 1.

The supporting base 1 is provided with a centrally disposed circular cutout portion 5 with which diametrically opposed extensions 6 and 7 communicate. The mineral crystal carrying cup 8 of the wave detector is positioned in the cutout portion 5 and it comprises a substantially cylindrical cup open at its upper end and having supporting stems 9 and 10 projecting therefrom at diametrically opposed points. The stem 9 is rockably supported in the upper end of an angular metal strip 11 of conductive material, which is attached, by means of a suitable screw or bolt 12, to the supporting base 1. The stem 10 is rockably supported by an angular metal bar 13 of conductive material, one end of which engages a conducting strip 14, being held in firm engagement with this conductive strip 14 by the bolt 15 which serves to connect both the angular bar 13 and the strip 14 to the supporting base 1. The strip 14 is connected to the binding post 16 which is provided to have connection with the wireless apparatus through the usual type of conducting cord (not shown) and the supporting base 1 is provided with an opening 17 through which this cord is adapted to extend.

Figure 2:
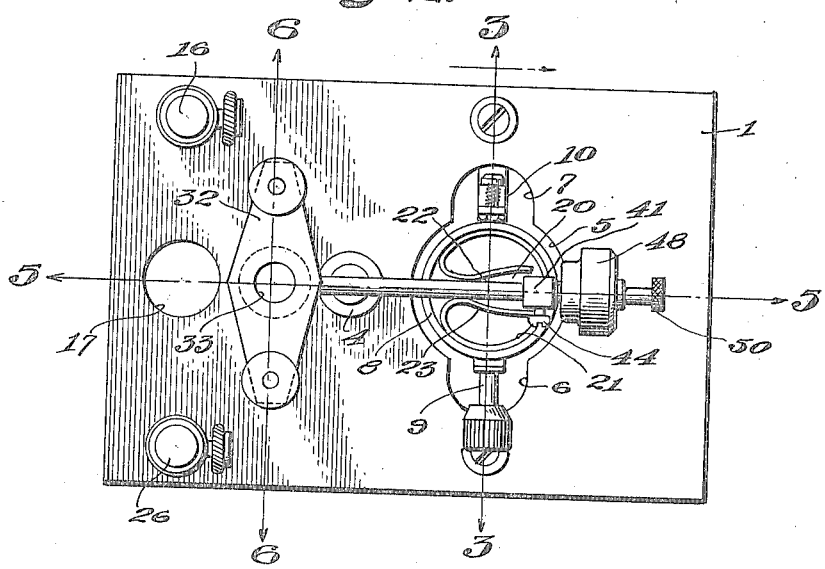
Fig. 2 is a top plan of the improved wave detector having the protecting covering removed.
Figure 3:
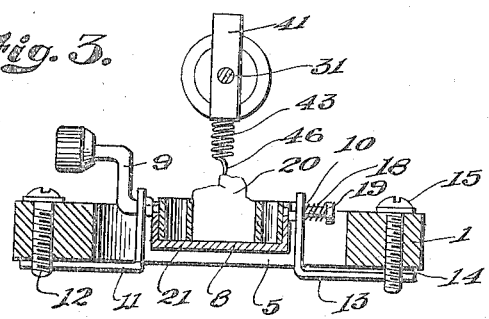
Fig. 3 is a vertical cross section through the detector taken on line 3—3 of Fig. 2.

The spring 18 is coiled about the stem or trunnion 10 and engages at one end against the head 19 formed on the stem 10 and at its other end against the supporting end of the angular bar 13. The mineral crystal, indicated at 20, may be mounted in the cup 8, either by the soft metal type or by means of the spring clip 21. The spring clip 21 will permit the free and easy removal from or placing into the cup 8 of the mineral crystal 20, and will yieldably hold the crystal 20 against movement during the use of the detector. The spring clip 20 is formed of a single length of spring steel, curved to fit within the cup 8 and to provide a pair of crystal engaging arms 22 and 23, one of which resiliently engages upon each side of the mineral crystal 20, as shown in Figs. 2 and 3 of the drawing.

The circuit through the detector structure is completed by the movable contact structure and binding post 24 which has connection by an angular strip 25 of conductive metal with the post 26 also of conductive metal. The post 26 is attached to the supporting base 1 by the suitable bolt or screw 27 which also serves as a conductor between the post 26 and metal strip 25. The post 26 is provided with a circular recess 28 in its upper end which receives therein a portion of the ball or sphere 29. The ball or sphere 29 is provided with diametrically extending, internally threaded opening 30, which receives therein the threaded end of the carrying rod 31. The ball 29 is maintained in the socket 28, and the frictional engagement of the ball 29 with the socket 28 is regulated, by the plate 32 of spring material which is provided with a centrally disposed opening 33 through which a portion of the ball 29 extends, as clearly shown in Fig. 6 of the drawings. The pressure of the spring plate 32 against the ball 29 and consequently the frictional engagement of the ball 29 in the socket 28 is regulated by the adjustment of the thumb nuts 34 and 35 upon the threaded reduced extensions 36 and 37 of the posts 38 and 39 respectively. The posts 38 and 39 are constructed of electric conducting material and are attached to the supporting base 1 by suitable screws or bolts 40.

The contact spring carrying block 41 is slidably, rotatably mounted upon the carrying rod 31 and is provided with an opening 42 in its lower end into which one end of the contact spring 43 extends. A set screw 49 extends into the carrying block 41 for engagement with the end of the spring 43 to securely connect the spring 43 to the carrying block 41 to permit the detachable connection of the spring and carrying block when necessary to replace the spring or change it to one of different composition.

In the marketing of the improved wave detector two contact springs will be provided, one of phosphorous bronze and another of an alloy of equal parts of gold, silver and copper, thereby eliminating oxidation and corrosion, which springs can be interchangeable when necessary.

The contact point 46 of the contact spring is sharpened to permit accurate adjustment of the contact between the spring and mineral crystal 20, and to prevent slipping of the spring from the crystal during use.

The carrying block 41 is provided with a lateral extension 47, which is rectangular shaped in cross section and has a button 48, of insulating material, mounted thereon to facilitate manual adjustment of the carrying block 41 and also of the carrying rod 31. A set screw 49 is carried by the carrying block 41 and may be engaged to bite into the carrying rod 31 to hold the block against adjusted movement of the rod 31. The carrying rod 31 has a head 50 formed upon its outer end which prevents movement of the carrying block 41 off the end of the rod. A transparent, preferably glass, cover 51 is provided to prevent accumulation of dust or other foreign matter upon the parts of the wave detector during use and shock absorbing resilient feet 52 are attached to the under surface of the supporting base 1 to absorb shocks incidental to vibration during the operation of the detector.

It is, of course, to be understood that the invention may be constructed in various other manners and the parts associated in different relations and therefore, I do not desire to be limited in any manner except as set forth in the claims hereunto appended.

Having thus described my invention what I claim is:

1. In a wave detector, a rockable mineral crystal supporting cup, and yieldable means within said cup for engagement with a mineral crystal for holding the crystal against displacement in the cup.

2. In a wave detector, the combination with a mineral crystal of a carrying rod, a ball and socket support for said carrying rod, a spiral spring slidably and rotatably carried by the carrying rod, one end of said spring being straightened and pointed to form a contact point.

3. In a wave detector, the combination with a mineral crystal of a carrying rod, a ball and socket support for said carrying rod, a spiral spring slidably and rotatably carried by the carrying rod, one end of said spring being straightened and sharpened to form a contact point and means for locking said contact spring against adjustment upon said rod.

4. In a wave detector, a mineral crystal supporting cup trunnions rockably supporting said cup, a rocking handle on one of said trunnions, and a spring engaging one of said trunnions to prevent accidental rocking of the cup.

5. In a wave detector, a mineral crystal supporting cup, trunnions rockably supporting said cup, a rocking handle on one of said trunnions, a spring engaging one of said trunnions to prevent accidental rocking of said cup, and yieldable means within the cup for engagement with a mineral crystal for holding the crystal against displacement within the cup.

6. In a wave detector, a mineral crystal supporting cup, trunnions rockably supporting said cup, a spring engaging one of said trunnions to prevent accidental rocking of the cup, and a spring within the cup and comprising a pair of resilient arms for engaging a mineral crystal to hold the crystal against displacement in said cup.

7. In a wave detector, a rockable mineral crystal supporting cup, a spring within said cup and comprising a pair of resilient arms for engaging a mineral crystal to hold the mineral crystal against displacement in said cup.

8. In a wave detector, a rockable mineral crystal carrying cup, yieldable means within said cup for engagement with a mineral crystal for holding the crystal against displacement in the cup, a carrying rod, a ball and socket support for said rod at one of its ends, and a resilient yieldable contact member carried by said rod.

9. In a wave detector, a rockable mineral crystal carrying cup, a carrying rod, a ball and socket support for said rod at one of its ends, a carrying block slidably and rotatably mounted upon said carrying rod, and a yieldable resilient contact carried by said carrying block.

10. In a wave detector, a carrying rod, a ball and socket support for said rod at one of its ends, a carrying block slidably and rotatably mounted upon said carrying rod, a spiral spring detachably carried by said carrying block, one end of said spring being bent to extend substantially in alignment with the axis of the spring and having its terminal sharpened for contact with a mineral crystal.

11. In a wave detector, a rockable mineral crystal carrying cup, a carrying rod, a ball and socket support for said rod at one of its ends, a carrying block slidably and rotatably mounted upon said carrying rod, a spring detachably carried by said carrying block, one end of said spring being bent to extend substantially in alignment with the axis of the spring and having its terminal sharpened for contact with a mineral crystal, and means for regulating the frictional engagement between said ball and socket, and a spring mineral engaging member mounted in said cup.

12. In a wave detector, a rockable mineral crystal carrying cup, a carrying rod, a ball and socket support for said rod at one of its ends, a carrying block slidably and rotatably mounted upon said carrying rod, a spring detachably carried by said carrying block, one end of said spring being bent to extend substantially in alignment with the axis of the spring and having its terminal sharpened for contact with a mineral crystal, and means for regulating the frictional engagement between said ball and socket, and a spring mineral engaging member mounted in said cup, binding posts, and electric conductive metal strips connecting said mineral cup and said socket to said binding posts.

13. In a wave detector, a rockable mineral crystal carrying cup, a spring within said cup and comprising a pair of resilient arms for engaging a mineral crystal to hold the crystal against displacement in the cup, a carrying rod, a ball and socket support for said rod, and a yieldable resilient contact member carried by said rod.

14. In a wave detector, a carrying rod, a ball on one end of said rod, a socket receiving said ball, and a resilient yieldable contact member adjustably supported by said rod.

15. In a wave detector, a carrying rod, a ball on one end of said rod, a socket receiving said ball, a block rotatably and slidably mounted upon said rod for adjusted movement thereon, and a contact spring carried by said block.

16. In a wave detector, a mineral crystal carrying cup, trunnions rockably carrying said cup, a spring engaging one of said trunnions to prevent accidental rocking of the cup, a carrying rod, a ball and socket support for said rod, a block slidably mounted upon said rod, and a contact spring carried by said block.

17. In a wave detector, a rockable mineral crystal carrying cup, a carrying rod, a support for said rod at one of its ends, a contact point carried by said rod, binding posts, and electric conductive metal strips connecting said cup and support to said binding posts.

In testimony whereof I affix my signature.

EMMET P. LINDNER.